United States Patent
Tamura

(10) Patent No.: US 10,148,862 B2
(45) Date of Patent: Dec. 4, 2018

(54) IMAGE CAPTURING APPARATUS, METHOD FOR CONTROLLING IMAGE CAPTURING APPARATUS FOCUS AREA DISPLAY, AND STORAGE MEDIUM

(71) Applicant: CANON KABUSHIKI KAISHA, Tokyo (JP)

(72) Inventor: Nobuhiko Tamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 9 days.

(21) Appl. No.: 15/264,714

(22) Filed: Sep. 14, 2016

(65) Prior Publication Data
US 2017/0078558 A1 Mar. 16, 2017

(30) Foreign Application Priority Data
Sep. 16, 2015 (JP) ................ 2015-183365

(51) Int. Cl.
*H04N 5/222* (2006.01)
*H04N 5/232* (2006.01)
(Continued)

(52) U.S. Cl.
CPC ....... *H04N 5/23212* (2013.01); *G06K 9/4604* (2013.01); *G06K 9/4661* (2013.01);
(Continued)

(58) Field of Classification Search
CPC . G06T 2207/10028; G06T 2207/10052; G06T 2200/21; H04N 5/23212;
(Continued)

(56) References Cited

U.S. PATENT DOCUMENTS 8,135,270 B2* 3/2012 Tanaka ............... H04N 5/23212
396/104
8,666,147 B2* 3/2014 Kokojima .......... G02B 27/2214
382/154

(Continued)

FOREIGN PATENT DOCUMENTS

JP 2012-142918 A 7/2012

OTHER PUBLICATIONS

Ng, Ren et al., "Light Field Photography with a Hand-held Plenoptic Camera," Stanford Tech Report CTSR 2005-02, Apr. 2005, pp. 1-11.

*Primary Examiner* — Ngoc-Yen Vu
(74) *Attorney, Agent, or Firm* — Carter, DeLuca, Farrell & Schmidt, LLP

(57) ABSTRACT

An image capturing apparatus of the present invention includes a display unit that displays an image obtained from an image capturing unit, the image capturing unit being a plenoptic image capturing unit capable of acquiring multi-viewpoint images having different viewpoints is provided. The image capturing apparatus includes: a disparity amount deriving unit that derives a disparity amount of the multi-viewpoint images in relation to a subject; a focus area specifying unit that specifies a subject area in which the derived disparity amount is equal to or smaller than a predetermined threshold as a focus area; and a display control unit that displays the specified focus area on the display unit in a manner different from an area other than the focus area.

19 Claims, 14 Drawing Sheets

LEFT-TOP IMAGE

RIGHT-TOP IMAGE

LEFT-BOTTOM IMAGE

RIGHT-BOTTOM IMAGE

(51) Int. Cl.
*G06T 7/00* (2017.01)
*G06K 9/46* (2006.01)
*G06K 9/62* (2006.01)
*H04N 5/235* (2006.01)

(52) U.S. Cl.
CPC ......... *G06K 9/4671* (2013.01); *G06K 9/6215* (2013.01); *G06T 7/0042* (2013.01); *G06T 7/0085* (2013.01); *G06T 2207/10052* (2013.01); *G06T 2207/30244* (2013.01)

(58) Field of Classification Search
CPC .. H04N 5/2254; H04N 13/02; H04N 13/0282; H04N 13/0232; H04N 13/0242; H04N 13/0228; G02B 6/29334
USPC .......................................... 348/345, 349–350
See application file for complete search history.

(56) References Cited

U.S. PATENT DOCUMENTS

| | | | |
|---|---|---|---|
| 8,941,749 B2* | 1/2015 | Yahata | G06T 5/50 348/218.1 |
| 9,055,218 B2* | 6/2015 | Nishiyama | H04N 5/217 |
| 9,161,016 B2* | 10/2015 | Sawachi | H04N 13/0246 |
| 2010/0283868 A1* | 11/2010 | Clark | G11B 27/034 348/231.4 |
| 2013/0100253 A1* | 4/2013 | Sawachi | H04N 13/0022 348/47 |
| 2014/0111627 A1* | 4/2014 | Ishigami | H04N 13/0011 348/51 |
| 2014/0176686 A1* | 6/2014 | Wakabayashi | H04N 13/0022 348/51 |
| 2014/0354774 A1* | 12/2014 | Kokojima | H04N 13/0022 348/45 |
| 2016/0191805 A1* | 6/2016 | Ito | H04N 5/23212 348/333.11 |
| 2018/0137674 A1* | 5/2018 | Yucer | G06T 7/564 |

* cited by examiner

IMAGE CAPTURING APPARATUS, METHOD FOR CONTROLLING IMAGE CAPTURING APPARATUS FOCUS AREA DISPLAY, AND STORAGE MEDIUM

BACKGROUND OF THE INVENTION

Field of the Invention

The present invention relates to display control of a focus area in a plenoptic image capturing apparatus.

Description of the Related Art

In recent years, a technique called light field photography in which a new optical element is added to an imaging optical system, images are acquired from a plurality of viewpoints, and image processing is performed on the acquired images to adjust the focusing position after image capturing has progressed.

The light field photography has a function called refocusing. The light field photography has an advantage since the focusing can be adjusted by refocusing after image capturing, failure in the adjustment of the focusing during image capturing can be compensated by image processing after image capturing. Further, since it is possible to acquire an image which focuses on various subjects captured by an image capturing apparatus from one captured image after image capturing, the light field photography also has an advantage that the number of times of image capturing can be reduced.

A plenoptic camera in which a microlens array is arranged behind a main lens is known as an example of an image capturing apparatus used for the light field photography. In the plenoptic camera, the microlens array is arranged at a position at which an imaging element (sensor) is arranged in a general image capturing apparatus. Due to such an arrangement of the optical element, light having passed through the right side of the main lens reaches the left side of the imaging element, and light having passed through the left side of the main lens reaches the right side of the imaging element. That is, in the general image capturing apparatus, the light having passed through the main lens is focused on one point. However, in the plenoptic camera, the light having passed through the main lens is separated into the light components entering from the right side and the left side of the microlens. As a result, the plenoptic camera can obtain multi-viewpoint images like the image obtained when the subject is seen from the left side and the image obtained when the subject is seen from the right side.

However, in the light field photography having a refocusing function, like the plenoptic camera, it is still important to align the focusing at the subject during image capturing. This results from the fact that refocusing is performed by integrating the pixel values of a plurality of images imaged at a plurality of viewpoints. This is because, since a subject outside the depth of field of an image capturing lens is imaged blurred, even if the pixel values of the image imaged blurred are integrated, it is difficult to acquire a refocused image after the image capturing.

A focusing checking method in a plenoptic camera is disclosed in Japanese Patent Laid-open No. 2012-142918. According to the method of Japanese Patent Laid-open No. 2012-142918, one image is selected from a plurality of images imaged by a plenoptic image capturing apparatus. The selected image is displayed on a liquid crystal display on the back side of the camera and a user can see a focused image with the naked eyes.

SUMMARY OF THE INVENTION

The focusing position of an image capturing apparatus without being limited to the plenoptic image capturing apparatus may be also checked by viewing a focal point detection frame displayed in a central portion of a finder as illustrated in FIG. 1. For example, in a finder display image illustrated in FIG. 1, a user can check the focusing position of a subject by viewing a focal point detection frame displayed in a state of being emphasized by a bold frame.

However, even when the focusing state of a focal point detection frame is checked, there is a problem that it is difficult to immediately check the focusing state in an area that is not covered by a focal point detection frame group. For example, in the example of the finder display image illustrated in FIG. 1, since a focal point detection frame corresponding to the face position of a person is displayed in an emphasized manner, it is necessary to analyze that "a person is generally in focus if the face is in focus", and this analysis is a burden on the user.

Moreover, a method of extending the focal point detection frame group to the entire finder display image and displaying a focal point detection frame superimposed on the subject in the focusing state in an emphasized manner to thereby present the focusing position of the subject to the user may also be considered.

However, in an image capturing apparatus which analyzes the contrast information of a captured image and displays a focal point detection frame corresponding to a subject area having high contrast in an emphasized manner, an image area in which the contrast is analyzed is extended and the detection accuracy of a subject in the focusing state decreases.

An image capturing apparatus according to the invention is an image capturing apparatus including a display unit that displays an image obtained from an image capturing unit, wherein the image capturing unit is a plenoptic image capturing unit capable of acquiring multi-viewpoint images having different viewpoints, the image capturing apparatus including: a disparity amount deriving unit that derives a disparity amount of the multi-viewpoint images in relation to a subject; a focus area specifying unit that specifies a subject area in which the derived disparity amount is equal to or smaller than a predetermined threshold as a focus area; and a display control unit that displays the specified focus area on the display unit in a manner different from an area other than the focus area.

Further features of the present invention will become apparent from the following description of exemplary embodiments (with reference to the attached drawings).

DESCRIPTION OF THE EMBODIMENTS

Hereinafter, an embodiment for embodying the invention will be described with reference to the drawings. However, constituent elements described in the embodiment are examples only, and the scope of the invention is not limited to these constituent elements.

Figure 1:
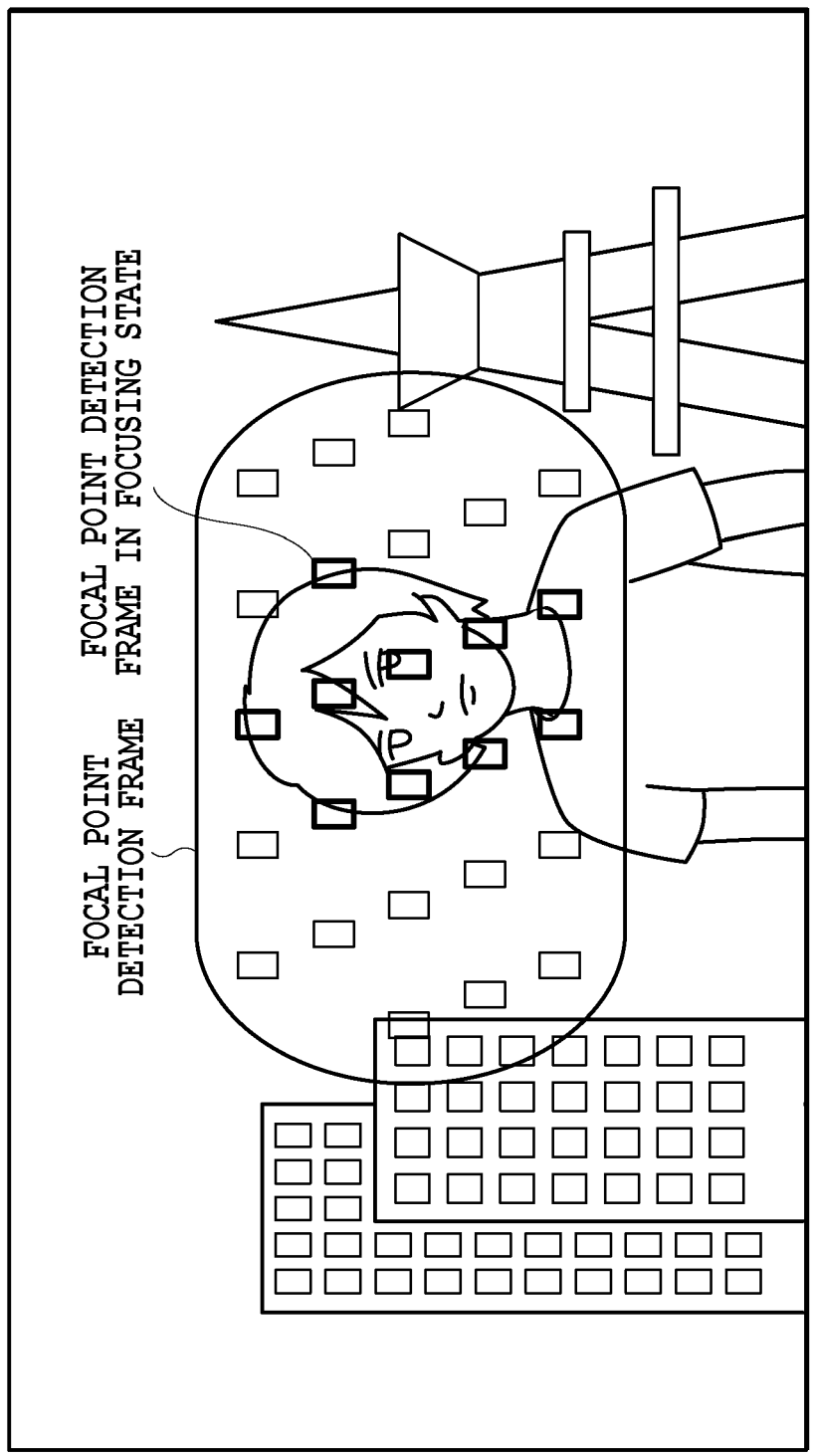
FIG. 1 is a diagram illustrating an example of a finder display image according to a conventional technique.
Figure 2:
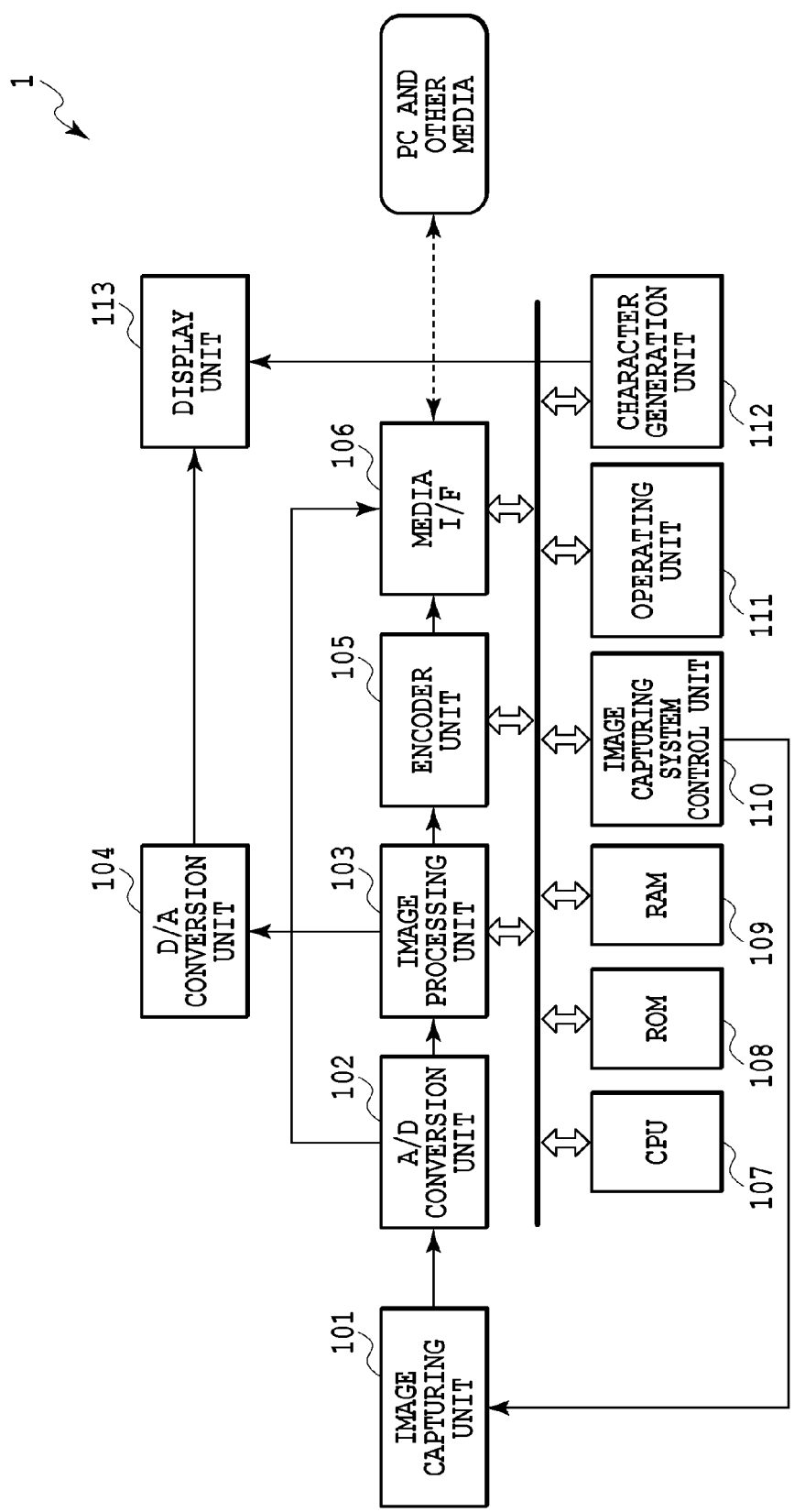
FIG. 2 is a diagram illustrating an example of a configuration of an image capturing apparatus according to an embodiment.

FIG. 2 is a diagram illustrating main constituent elements of a plenoptic image capturing apparatus (camera) 1 according to the present embodiment.

An image capturing unit 101 includes a zoom lens, a microlens, a focus lens, a blur correction lens, a diaphragm, a shutter, an optical low-pass filter, an IR cutoff filter, a color filter, and a sensor such as CMOS or CCD and is configured to detect the amount of subject light. The image capturing unit 101 can obtain multi-viewpoint images having different viewpoints, and the details thereof will be described later. The optical low-pass filter is arranged to reduce a high-frequency pattern which causes false color in an image capturing system which employs a color filter and reduce the amplitude of an input pattern near the frequency which causes the false color.

An A/D conversion unit 102 converts the detected amount of subject light to a digital value.

An image processing unit 103 performs various image processes on the converted digital value to generate a digital image. The details of the image processing unit 103 will be described later.

A D/A conversion unit 104 performs analog conversion on the generated digital image.

An encoder unit 105 converts the generated digital image to a file having the format such as jpeg or mpeg.

A media I/F 106 is an interface for connecting to a PC and other media (for example, a hard disk, a memory card, a CF card, a SD card, and a USB memory).

A CPU 107 is a processor that integrally controls respective units. The CPU 107 of the present embodiment functions as a display control unit that causes a display unit 113 to display a display image output from the image processing unit 103. Moreover, the CPU 107 of the present embodiment functions as a recording unit that causes the image output from the image processing unit 103 and displayed by the display unit 113 and various items of data used for generating the image to be recorded on a recording medium.

A ROM 108 stores a control program or the like executed by the CPU 107.

A RAM 109 functions as a main memory, a work area, and the like of the CPU 107.

The image capturing system control unit 110 controls the image capturing system based on an instruction from the CPU 107 such as instructions to realize focusing, open the shutter, and adjust the diaphragm.

An operating unit 111 corresponds to a button, a mode dial, and the like and a user's instruction is input via these elements.

A character generation unit 112 generates characters, graphics, and the like.

The display unit 113 displays the captured image and the character received from the character generation unit 112 and the D/A conversion unit 104. A liquid crystal display is generally and broadly used in the display unit 113. Moreover, the display unit 113 may have a touch screen function and a user's instruction input using the touch screen can be handled as the input to the operating unit 111.

Figure 3:
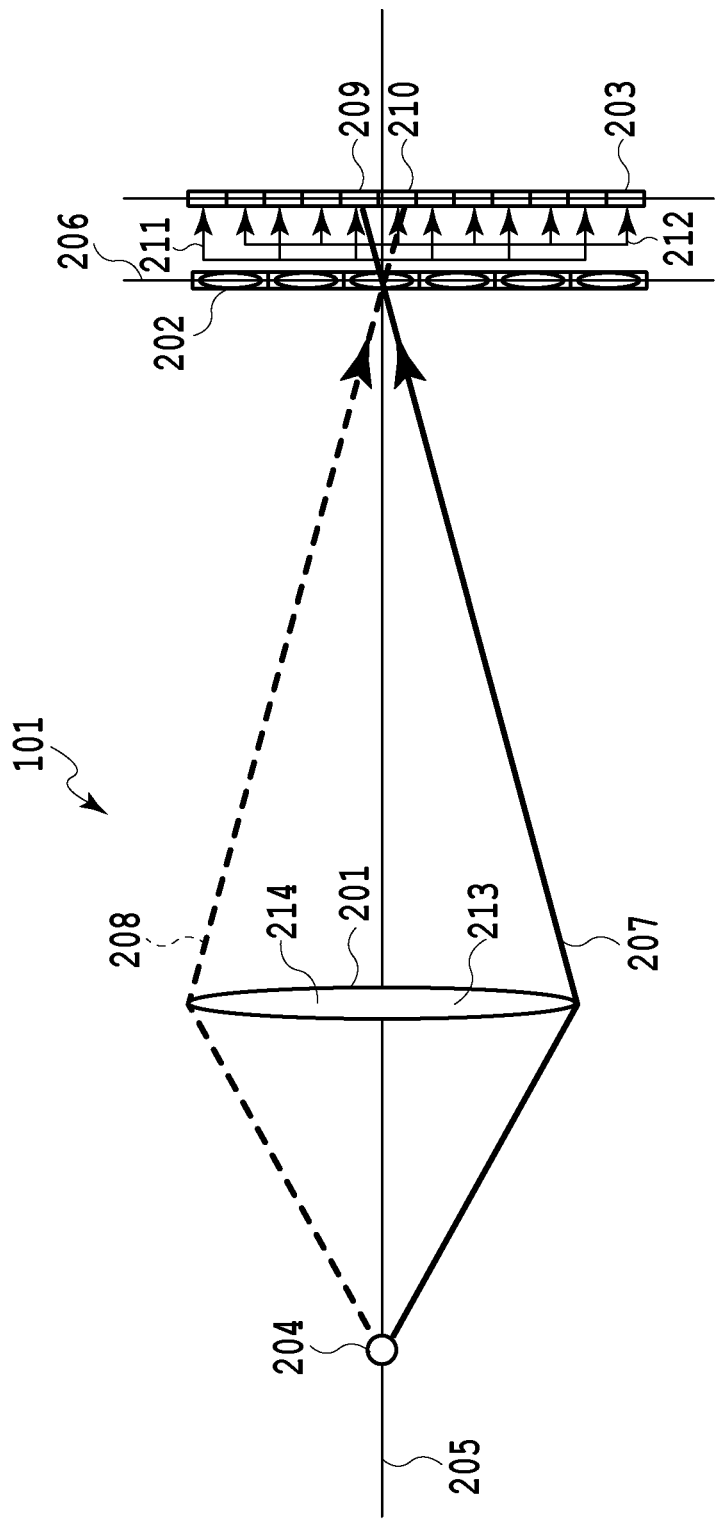
FIG. 3 is a diagram illustrating an example of a configuration of an imaging optical system according to an embodiment.

Next, the details of the image capturing unit 101 according to the present embodiment will be described with reference to FIG. 3. The diagram of the image capturing unit 101 illustrated in FIG. 3 is a schematic view when the image capturing unit 101 is seen from above. The image capturing unit 101 is configured as a plenoptic imaging optical system including a main lens 201, a microlens array 202, and a sensor 203. Light emitted from a focused subject 204 is focused on an imaging plane 206 by the main lens 201. As illustrated in FIG. 3, it can be understood that rays of light 207 and 208 emitted from the left and right sides of the focused subject 204 and having passed through the main lens 201 are focused at one point on the imaging plane 206. In a general camera, the sensor 203 is arranged at the position of the imaging plane 206 to record a subject image. In this case, the image of the focused subject 204 is represented by the sum of the amount of the ray of light 207 and the amount of the ray of light 208.

On the other hand, in the configuration of the image capturing unit 101 of the present embodiment, the microlens array 202 instead of the sensor 203 is arranged on the imaging plane 206. One microlens has a function of separating the ray of light focused on the imaging plane 206 in two directions. That is, the microlens array 202 can be said a viewpoint separation element. The separated rays of light are recorded by the sensor 203 arranged at the back of the microlens array 202. As illustrated in FIG. 3, the ray of light 207 is received by a pixel 209 and the ray of light 208 is received by a pixel 210. Similarly, light emitted from the subject is separated to the left and right sides by the function of the microlens and the separated rays of light are received by pixels other than the pixels 209 and 210 of the sensor 203.

Figure 4:
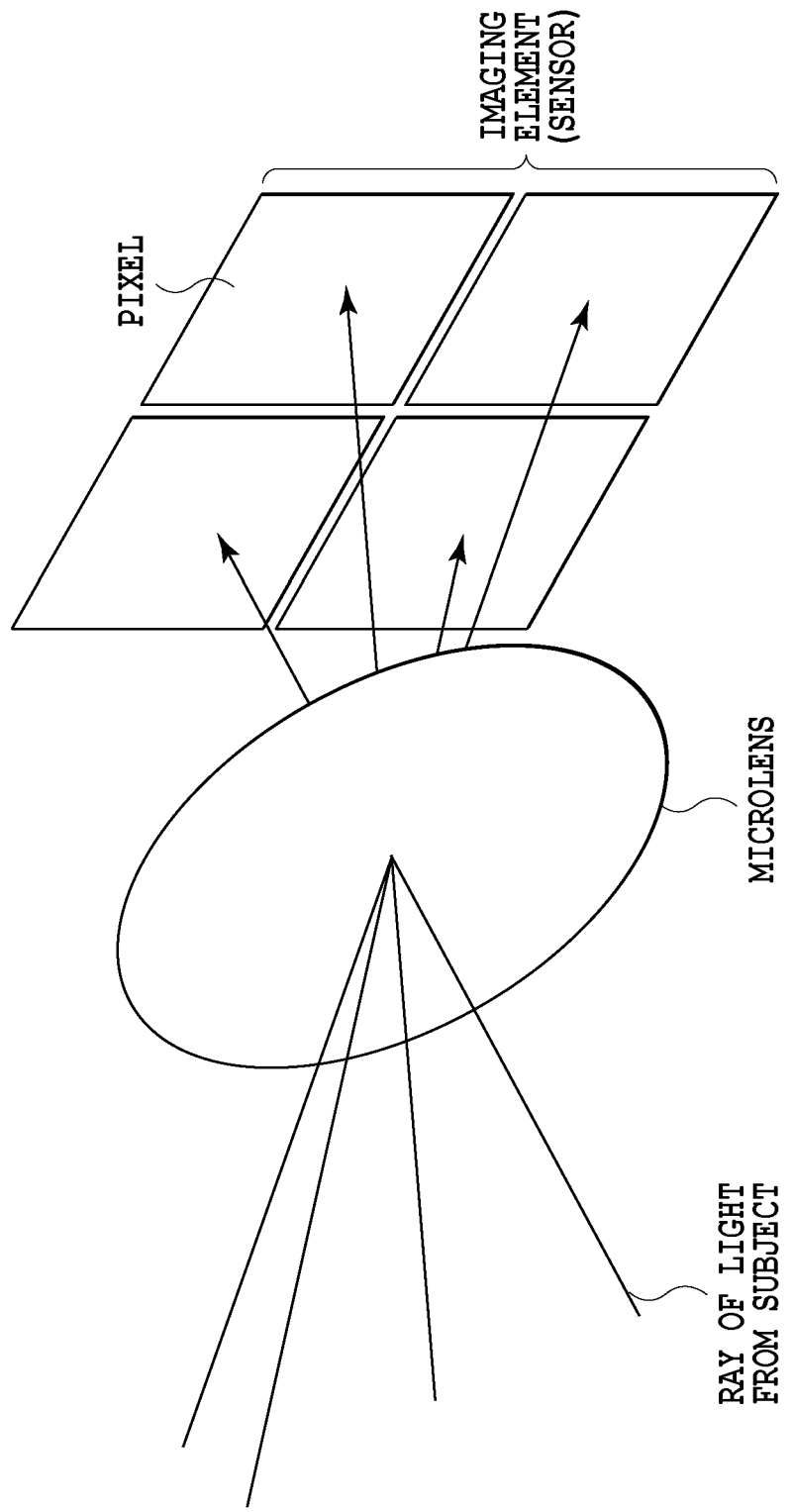
FIG. 4 is a diagram illustrating an example of separation of rays of light according to an embodiment.

When images are generated from a pixel group 211 that receives the rays of light from the left side, emitted from the focused subject 204 and a pixel group 212 that receives the rays of light from the right side, emitted from the focused subject 204, two multi-viewpoint images of the focused subject 204 seen from the left and right sides are obtained. In this case, the viewpoints corresponding to the image seen from the left side and the image seen from the right side are points 213 and 214, respectively. Practically, since the sensor 203 and the microlens array 202 are arranged two-dimensionally in vertical and horizontal directions, the ray of light from the subject is separated in four directions, for example, and recorded as illustrated in FIG. 4. Thus, with one image capturing operation, it is possible to record multi-viewpoint images of the subject seen from the four directions of the right-top, left-top, right-bottom, and left-bottom sides. Hereinabove, the configurations of the plenoptic image capturing unit 101 capable of acquiring multi-viewpoint images having different viewpoints and the function realized by these configurations have been described.

Figure 5:
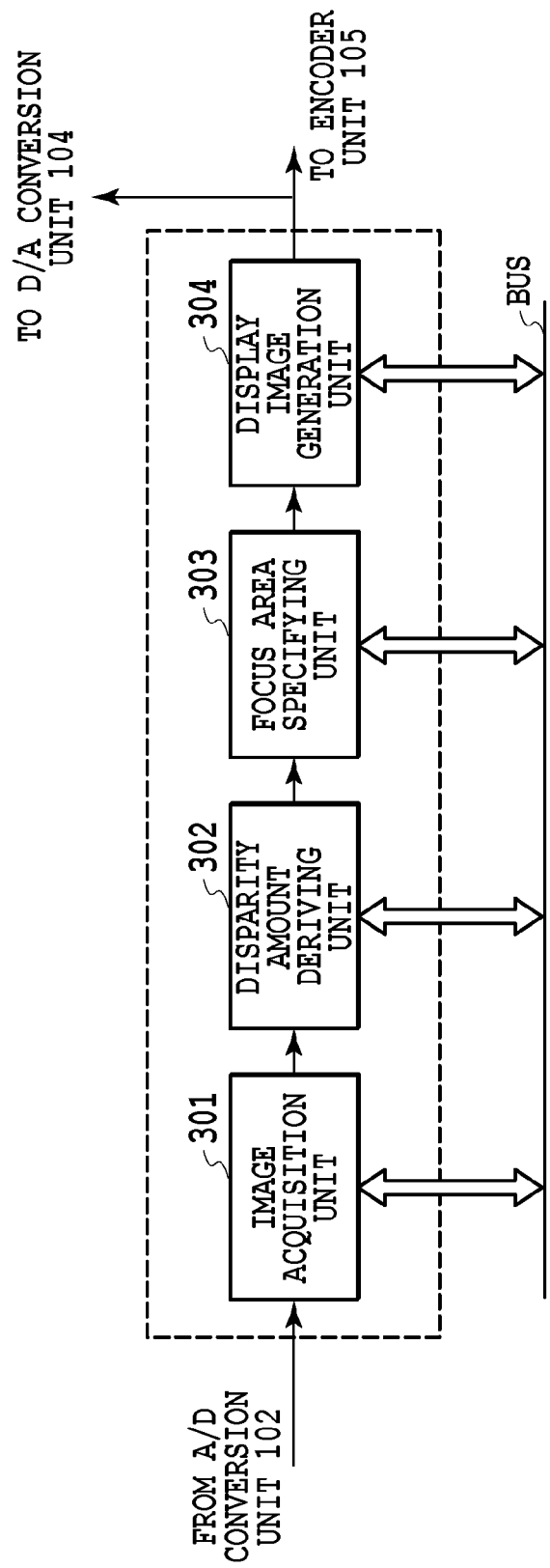
FIG. 5 is a diagram illustrating an example of a functional block of an image processing unit according to an embodiment.

Next, the details of the image processing unit 103 according to the present embodiment will be described with reference to FIG. 5. FIG. 5 is a diagram illustrating a configuration related to generation of a display image among the inner configurations of the image processing unit 103. The image processing unit 103 of the present embodiment includes an image acquisition unit 301, a disparity amount deriving unit 302, a focus area specifying unit 303, and a display image generation unit 304. Although the image processing unit 103 includes other constituent elements (not illustrated) such as a noise reduction unit, an edge enhancement unit, a color conversion unit, and a gamma conversion unit, the description thereof will not be provided in the present embodiment for the sake of simplicity. The image processing unit 103 of the present embodiment performs predetermined processing on the signals (digital image data) input from the A/D conversion unit 102 with the aid of the respective units illustrated in FIG. 5 to thereby generate display image data (through-the-lens image data) displayed on the display unit 113. The generated display image data is recorded on various media via the media I/F 106.

In the present embodiment, an embodiment in which the image processing unit 103 is one constituent element of the image capturing apparatus 1 has been described. In another embodiment, the function of the image processing unit 103 may be realized by an external device such as a PC or a microchip. That is, the image processing unit 103 of the present embodiment may be one of the functions of the image capturing apparatus or may be realized as an independent image processing device.

Next, the flow of a display image generation process executed by the image processing unit 103 will be described with reference to FIG. 6. This flow is executed when program codes stored in the ROM 108 are imported into the RAM 109 and are executed by the CPU 107.

Figure 7:
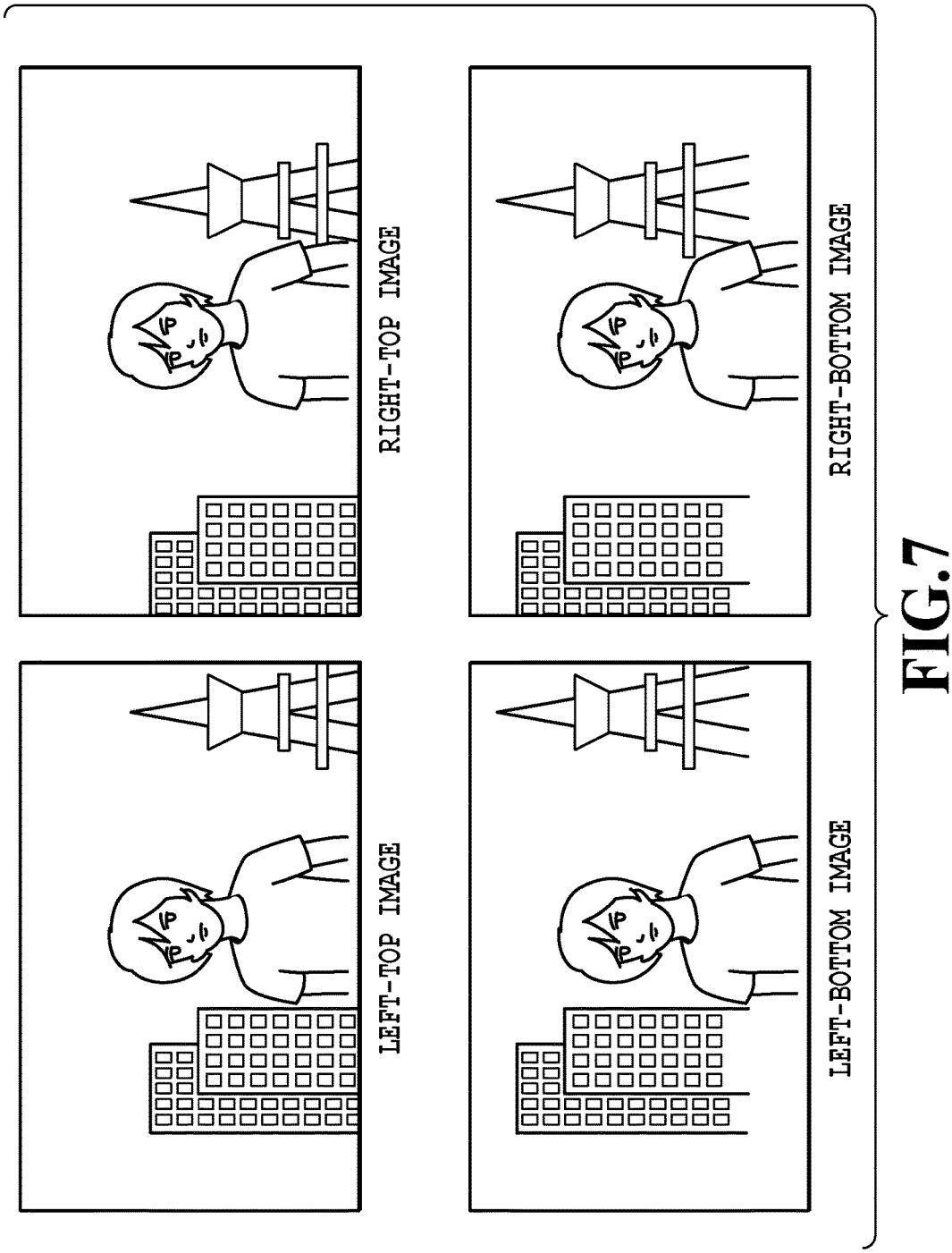
FIG. 7 is a diagram illustrating an example of a multi-viewpoint image according to an embodiment.

In S401, the image acquisition unit 301 acquires multi-viewpoint images from the image capturing unit 101 via the A/D conversion unit 102. FIG. 7 illustrates an example of the multi-viewpoint images acquired by the image acquisition unit 301 in the present embodiment. In the example of the multi-viewpoint images illustrated in FIG. 7, a plurality of images of the subject seen from the four directions of the right-top, left-top, right-bottom, and left-bottom sides is illustrated.

In S402, the disparity amount deriving unit 302 derives a disparity amount of a multi-viewpoint image in relation to the subject from the multi-viewpoint images having different viewpoints acquired in S401. In the present embodiment, the disparity amount corresponds to the shift amount of the multi-viewpoint image in relation to the subject. The items of image data corresponding to the four images illustrated in FIG. 7 are represented by $I_1(x,y)$, $I_1(x,y)$, $I_3(x,y)$, and $I_4(x,y)$. Here, $I_i(x,y)$ represents the pixel value at a pixel position $(x,y)$ in a two-dimensional coordinate of the i-th image data. The disparity amount deriving unit 302 derives the disparity amount $I_d(x,y)$ by calculating the standard deviation of each pixel of the multi-viewpoint image.

$$I_d(x, y) = \sqrt{\frac{1}{4}\left(\sum_{i=1}^{4} I_i(x, y)^2\right) - \left(\frac{1}{4}\sum_{i=1}^{4} I_i(x, y)\right)^2} \quad \text{Formula (1)}$$

In the disparity amount $I_d(x,y)$ derived by Formula (1), when the disparity amount $I_d(x,y)$ has a small value, it means that a subject captured at the pixel position $(x,y)$ is in the focusing state.

This can be understood by the following description. As illustrated in FIG. 3, light from the focused subject 204 is separated to be directed to the pixels 209 and 210 by the microlens array 202 positioned on the imaging plane 206 and the separated rays of light are recorded in the pixels 209 and 210. Since the values read from the pixels 209 and 210 correspond to the same pixel position $(x,y)$ and these pixel values record the light emitted from the same subject, the respective pixel values are equal or the difference therebetween decreases. These characteristics appear in other pixels other than the pixels 209 and 210. Thus, the disparity amount $I_d(x,y)$ of a subject in the focusing state will be zero or have a small value.

The disparity amount may represent the difference between the pixel values of items of image data having at least two viewpoints and is not always limited to an embodiment in which the disparity amount $I_d(x,y)$ is derived based on the standard deviation. For example, a combination of two or more different images may be selected from multi-viewpoint images, the pixel values of the selected two items of image data may be compared according to a known block matching technique, and the disparity amount $I_d(x,y)$ may be derived from the comparison result. Alternatively, in order to accelerate the generation of the display image, a combination of two or more different images may be selected from four different multi-viewpoint images, and the difference between the pixel values of the two selected items of image data may be calculated. In this way, the number of computations is reduced. Besides this, the difference between the left-top image and the right-top image among the four different multi-viewpoint images and the difference between the left-bottom image and the right-bottom image may be averaged to derive the disparity amount $I_d(x,y)$.

Alternatively, a computation method in disparity image generation may be changed as below depending on the optical characteristics of the image capturing unit 101. In the image capturing unit 101 illustrated in FIG. 3, the light emitted from the focused subject 204 is refracted by the main lens 201 and is focused at one point on the imaging plane 206. The image capturing unit 101 illustrated in FIG. 3 is assumed to have the optical characteristics of an ideal lens. However, the optical characteristics of the main lens 201 are practically different from the optical characteristics of an ideal lens. For example, there is a small difference between the amount of the ray of light emitted from the left side and the amount of the ray of light emitted from the right side, and a small difference may occur in the image acquired by the imaging element. If the disparity amount $I_d(x,y)$ is generated according to Formula (1) despite such a difference, the disparity amount $I_d(x,y)$ of the subject in the focusing state may become a large value. Thus, when generating the disparity amount $I_d(x,y)$, information that defines a combination of two or more different images to be used for deriving the disparity amount may be stored in the ROM 108 in advance, and the disparity amount deriving unit 302 may derive the disparity amount by referring to the information.

Figure 8:
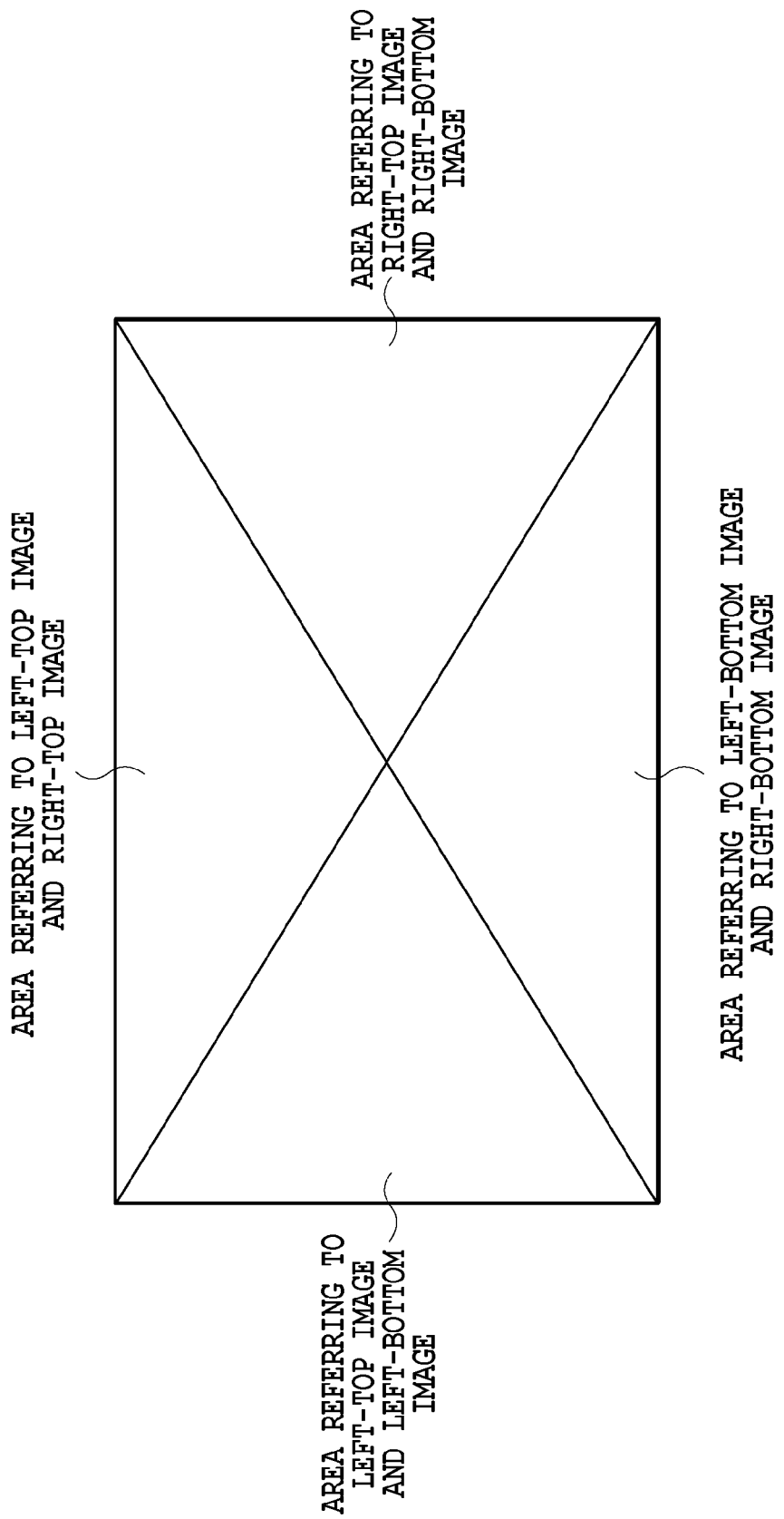
FIG. 8 is a conceptual diagram of information that defines a combination of images according to an embodiment.

FIG. 8 is a conceptual diagram of the information that defines a combination of two or more images used for deriving the disparity amount, stored in the ROM 108. In the definition information illustrated in FIG. 8, the combination of two or more images is defined based on the image capturing characteristics (brightness, color, and the like) of the images in the respective divided areas. For example, it is assumed that the main lens 201 of the present embodiment has such optical characteristics that there is a small difference between the amount of the ray of light emitted from the bottom side and the amount of the ray of light emitted from the top side. In this case, in the multi-viewpoint images acquired by the image processing unit 103, a phenomenon in which the left-top image and the right-top image have similar image capturing characteristics but the left-top image and the left-bottom image have different image capturing characteristics may happen. Thus, in the multi-viewpoint images obtained from the image capturing unit 101 having the optical characteristics described above, it is preferable to derive the disparity amount of the divided areas in the central upper portion of the multi-viewpoint images based on a combination of the two images of the left-top image and the right-top image. The image capturing characteristics of the multi-viewpoint images can be preferably derived based on the design data of the image capturing unit 101. Moreover, the definition information illustrated in FIG. 8 is an example only and may be set appropriately.

Figure 9:
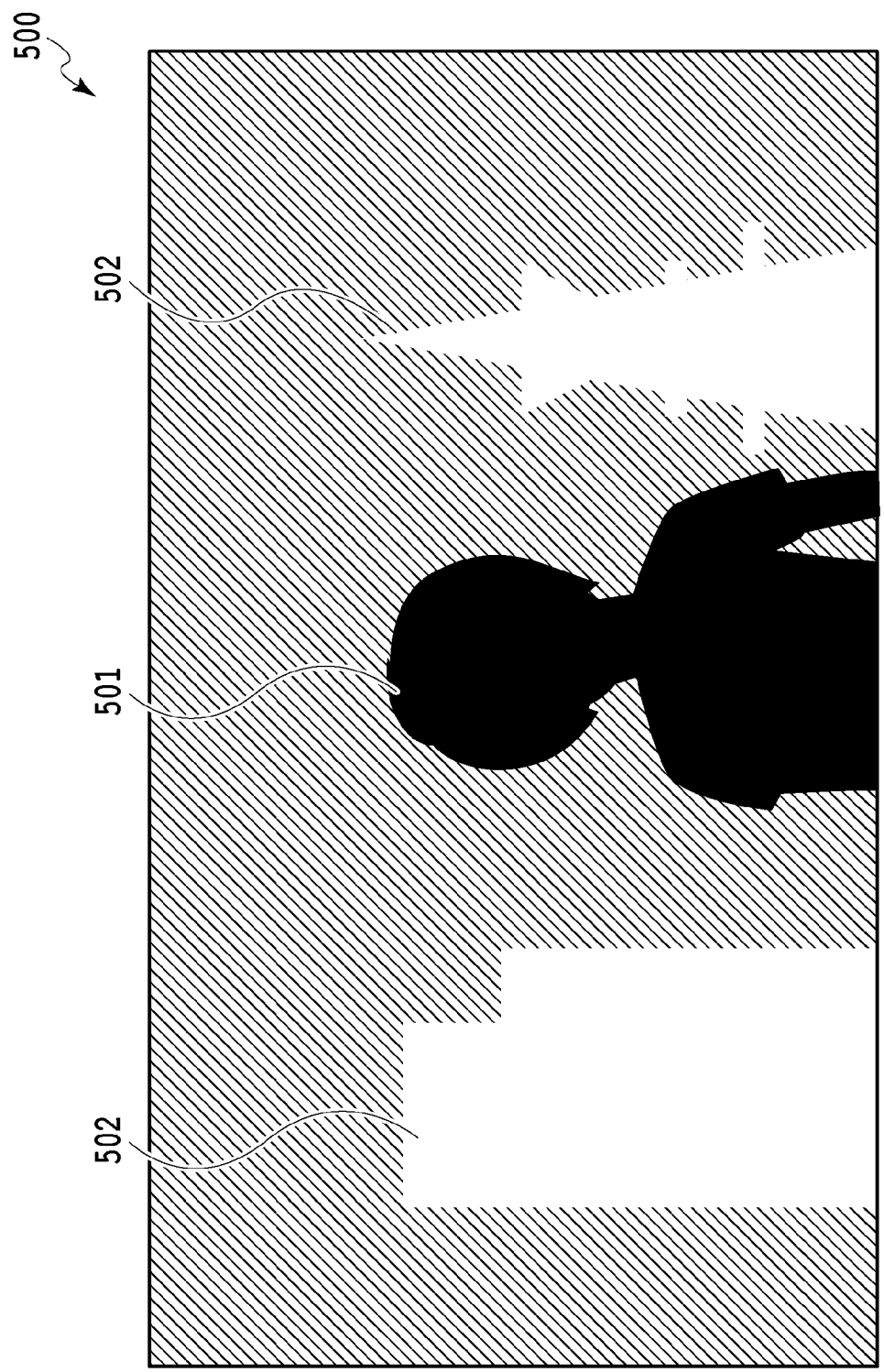
FIG. 9 is a diagram illustrating an example of a disparity map according to an embodiment.

FIG. 9 illustrates an example of a disparity map 500 according to the present embodiment. The disparity map 500 illustrated in FIG. 9 is an image which is based on the disparity amount derived in S402 and in which the magnitude of the disparity between multi-viewpoint images is represented by brightness. In the disparity map 500 of the present embodiment, a dark area 501 indicates that the calculation result of Formula (1) has a small value (that is, the difference between multi-viewpoint images is small). On the other hand, a bright area 502 indicates that the calculation result of Formula (1) has a large value (that is, the difference between multi-viewpoint images is large). In the example of the disparity map 500 illustrated in FIG. 9, since a person is in the focusing state, the difference value in the person area is small. Thus, the person area captured by the image capturing apparatus 1 is displayed dark in the disparity map 500.

Figure 6:
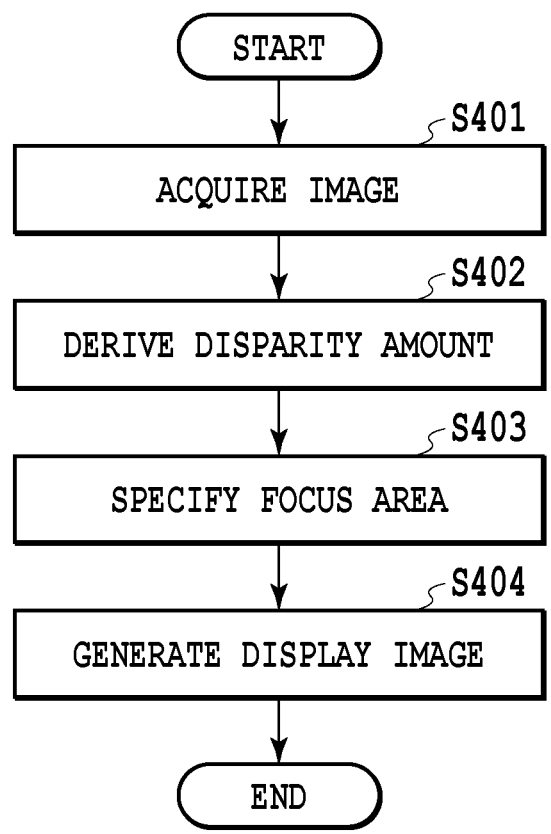
FIG. 6 is a flowchart illustrating an example of a display image generation process according to an embodiment.

Returning to the flowchart of FIG. 6, in S403, the focus area specifying unit 303 specifies a focus area which is the area of the person in the focusing state from the disparity amount derived in S402. Specifically, the focus area specifying unit 303 generates focus area data indicating the area of the subject being in the focusing state. The focus area data can be obtained by performing predetermined threshold processing on the disparity amount $I_d(x,y)$. Specifically, the focus area data can be obtained by performing threshold processing on the disparity amount $I_d(x,y)$ according to the following formula.

$$Ia(x, y) = \begin{cases} 1 & \text{if } Id(x, y) \leq \text{threshold} \\ 0 & \text{if } Id(x, y) > \text{threshold} \end{cases} \quad \text{Formula (2)}$$

As illustrated in Formula (2), "1" is allocated when the disparity amount has a value of a threshold or smaller and "0" is allocated when the disparity amount has other values. The threshold of the present embodiment is preferably set based on the amount of noise that is expected to be included in the image when the multi-viewpoint images are captured by the image capturing unit 101. Since noise components are included in the image input to the image capturing apparatus 1, the value derived by Formula (1) is not zero in the focus area of the subject. Thus, when deriving the disparity amount, it is preferable to set the standard deviation of the noise acquired by measurement or the like in advance to the threshold and compare the threshold with the value derived by Formula (1). Further, the amount of shot noise included in the input image tends to increase as the brightness of the input image increases. Thus, it is preferable to set a large threshold to an area having a large pixel value of the multi-viewpoint image (see FIG. 7) and set a small threshold to an area having a small pixel value.

Figure 10:
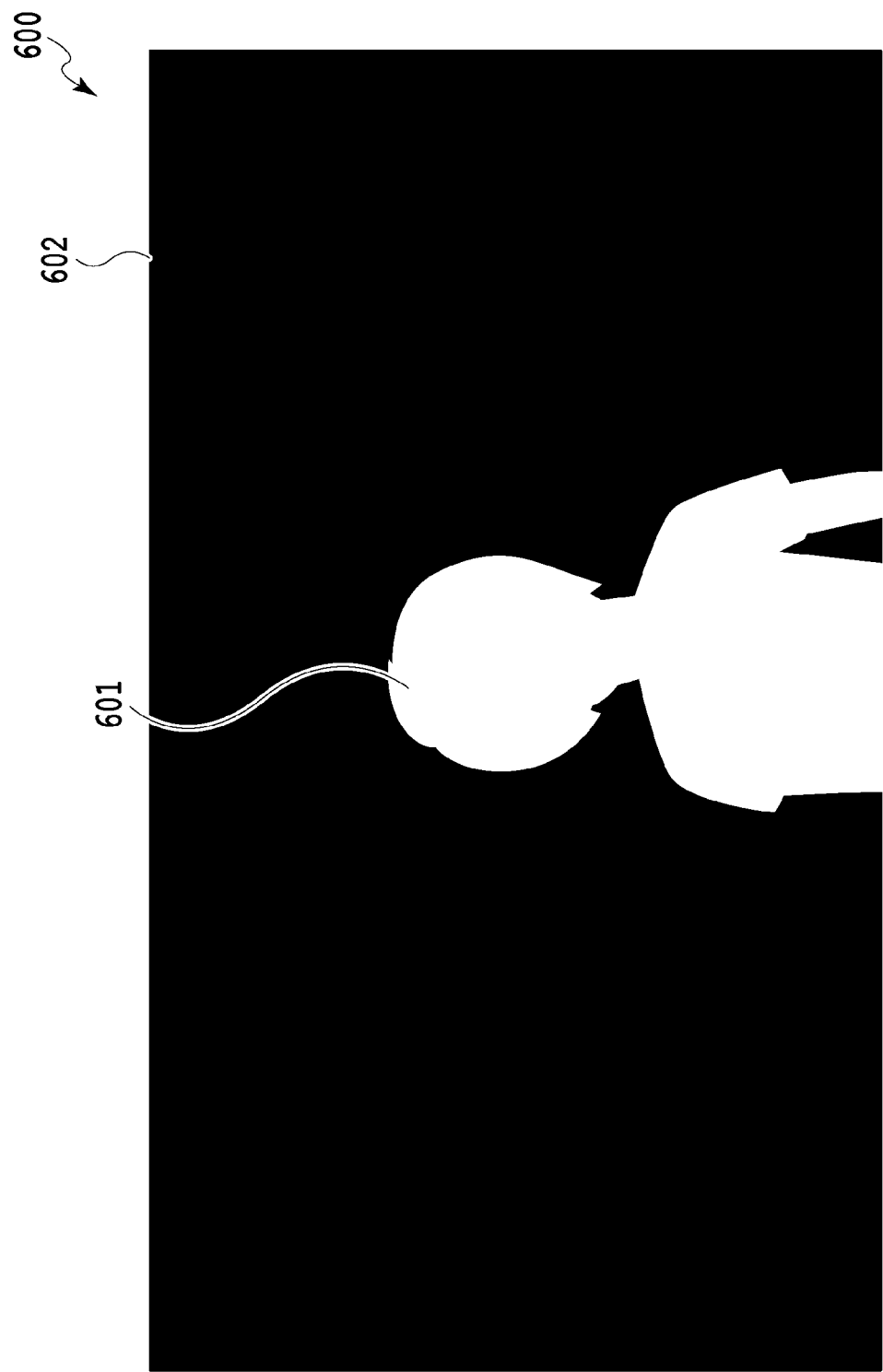
FIG. 10 is a diagram illustrating an example of an area image according to an embodiment.

FIG. 10 illustrates an area image 600 generated based on the focus area data generated in S403. In the area image 600 illustrated in FIG. 10, a white area indicates a focus area 601 in which $I_a(x,y)=1$. On the other hand, a black area indicates a non-focus area 602 in which $I_a(x,y)=0$. In Formula (2), values corresponding to pixel values quantized to 8-bit gradation may be allocated so that "255" is allocated to values of which the disparity amount is equal to or smaller than the threshold and "0" is allocated to the other values. With this configuration, it is possible to generate the area image 600 from the focus area data easily.

Figure 11:
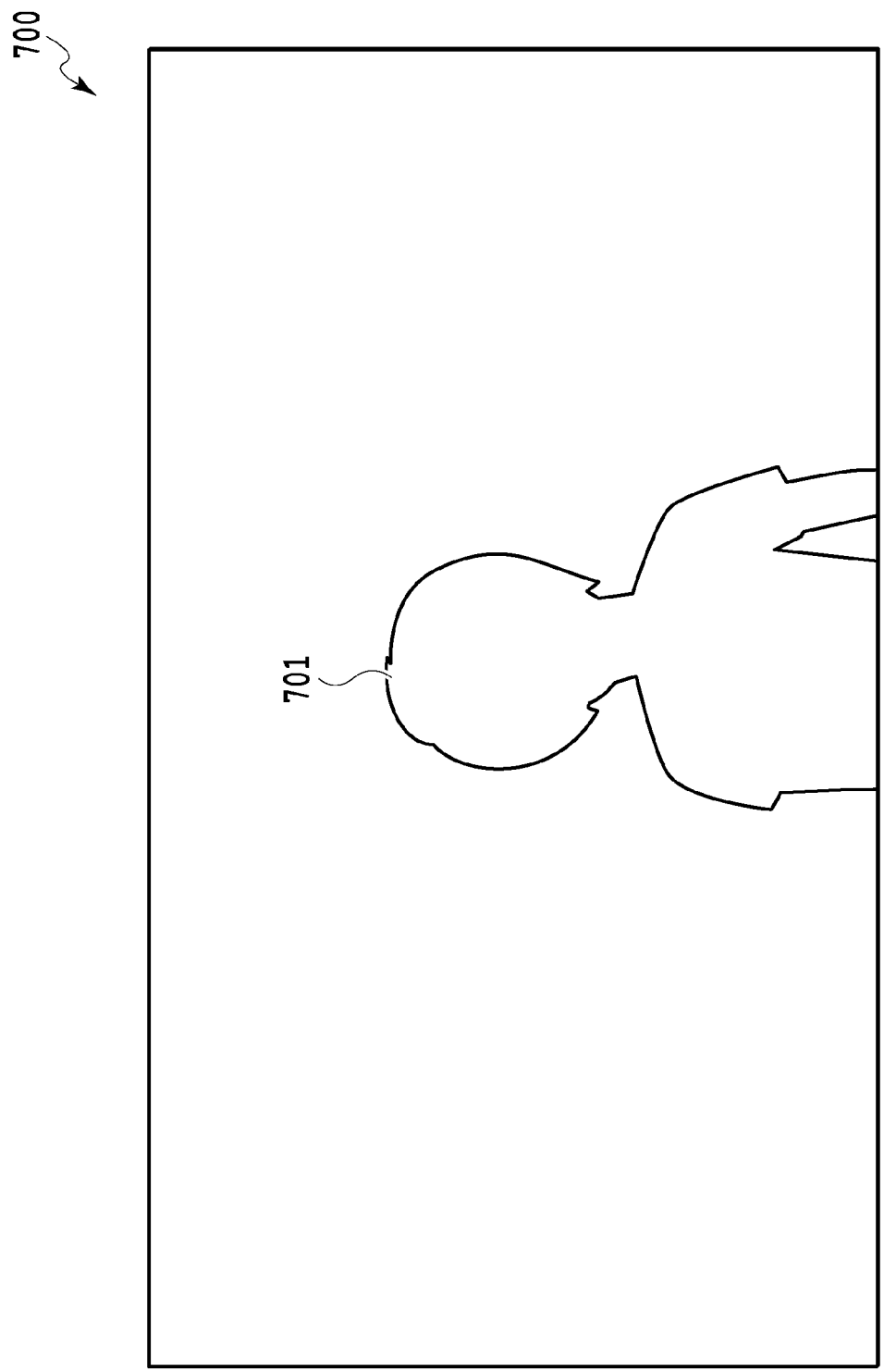
FIG. 11 is a diagram illustrating an example of a boundary image according to an embodiment.

Returning again to the flowchart of FIG. 6, in S404, the display image generation unit 304 generates a display image to be displayed on the display unit 113 from the input image obtained from the image capturing unit 101 and the focus area data generated in S403. In the present embodiment, the display image generation unit 304 generates a boundary image indicating the boundary between the focus area 601 and the non-focus area from the area image 600, for example, and overlays the boundary image on the input image to thereby generate the display image data. As a method of generating the boundary image from the area image 600, a method of applying an edge detection filter such as the Laplacian filter to the area image 600 generated in S403 to obtain a boundary image 700 illustrated in FIG. 11 may be used. The boundary image 700 illustrated in FIG. 11 includes a boundary line 701 indicating the boundary between the focus area 601 and the non-focus area, and the boundary line 701 is a boundary line indicating the contour of the person.

Figure 12:
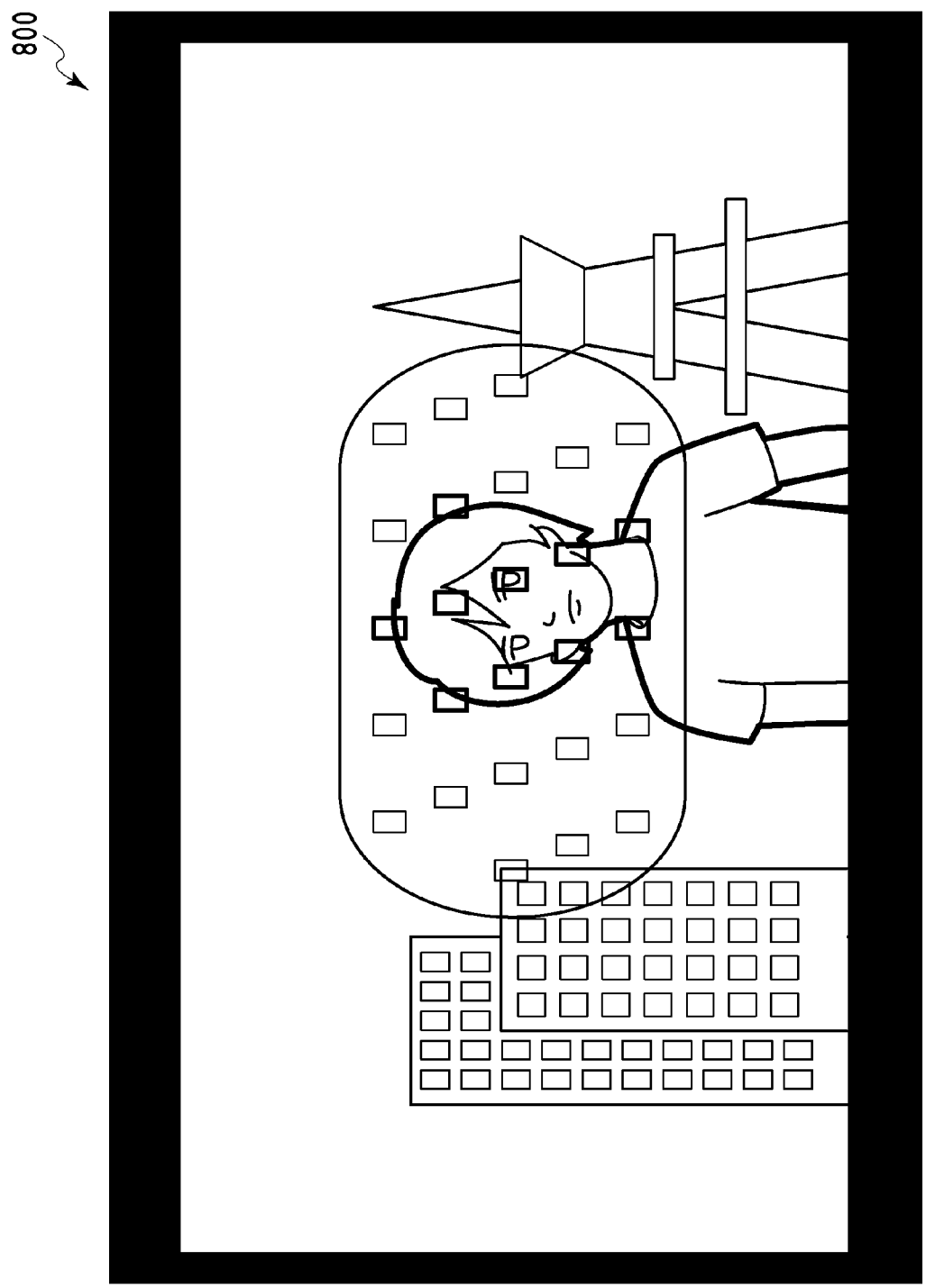
FIG. 12 is a diagram illustrating an example of a display image according to an embodiment.

Subsequently, the CPU 107 overlays the boundary image 700 on the input image and displays the image on the display unit 113. The CPU 107 displays the focus area specified in S403 on the display unit 113 in a manner different from the focus area. FIG. 12 is a diagram illustrating an example of a display image 800 displayed on the display unit 113 in the present embodiment. A subject in the focusing state among the subjects captured by the image capturing unit 101 is displayed in an emphasized manner by being surrounded by a boundary line. In the present embodiment, the display image 800 generated in S404 is displayed on the display unit 113 as a live-view image and is also displayed on a finder (not illustrated). Thus, the user can immediately check the focusing state of the respective subjects. The user can immediately understand the focus areas of the subject are portions in which a person is captured by viewing the display image 800 illustrated in FIG. 12.

Such a display image 800 may be displayed on the finder simultaneously with the focal point detection frame when the shutter (not illustrated) of the image capturing apparatus 1 is half-pressed, for example. Alternatively, the display image 800 may be displayed on the display unit 113 when the user performs an operation on a touch screen (the display unit 113).

Figure 13:
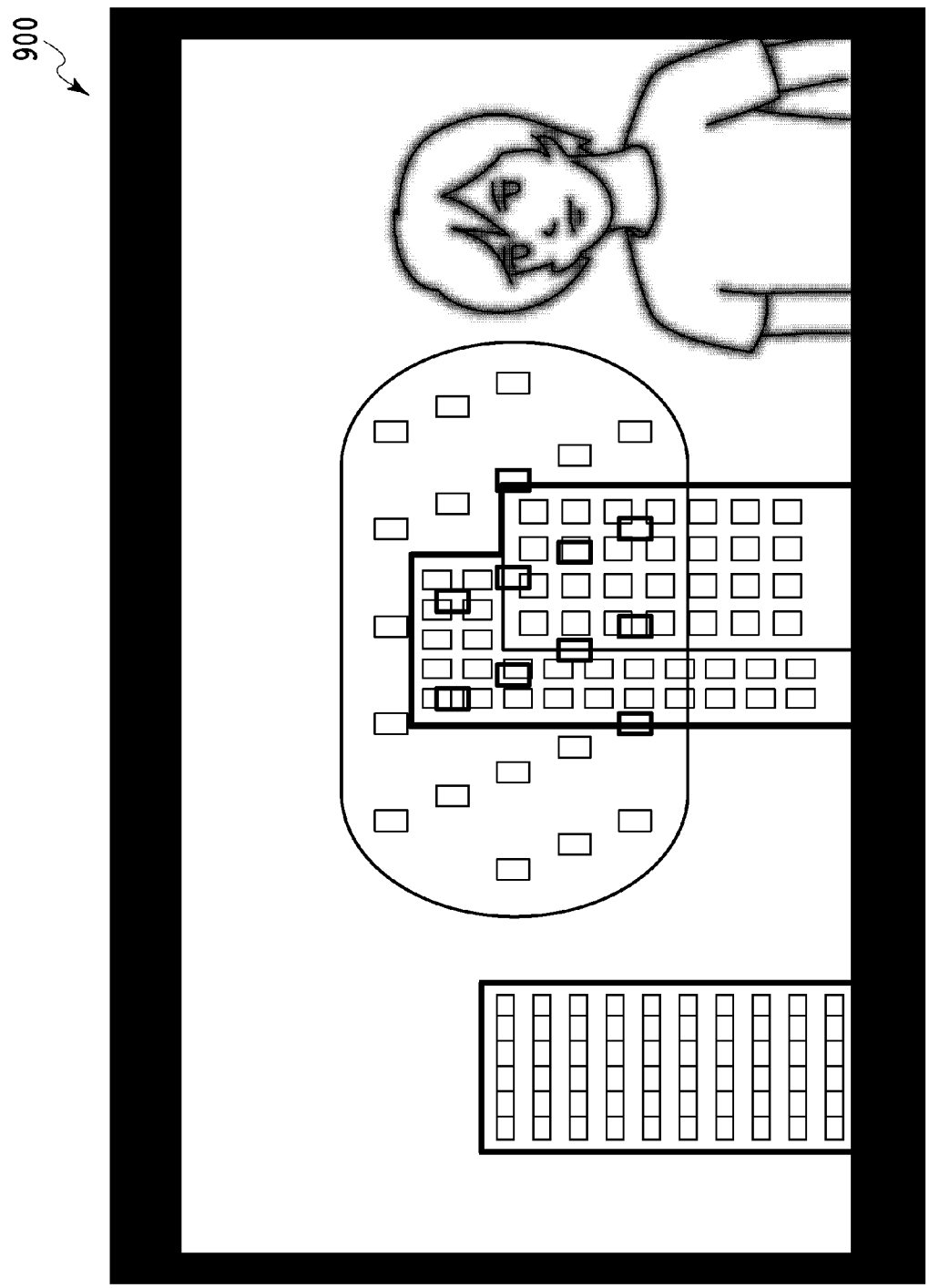
FIG. 13 is a diagram illustrating an example of a display image according to an embodiment.

FIG. 13 illustrates an example of a display image displayed on the display unit 113 when the shutter is half-pressed or an operation is input to the touch screen (the display unit 113) after the subject captured at the center changes from a person to a building. In this case, the focal point detection frame that captures the building is displayed in an emphasized manner, and the CPU 107 overlays a boundary image indicating the contour of the building on the display image and displays the display image on the display unit 113 in order to indicate that the entire building is in the focusing state. Further, even when a focus area does not overlap a focal point detection frame group, if the disparity amount between the multi-viewpoint images is equal to or smaller than a predetermined threshold, the focus area is displayed in a manner different from other areas. For example, as in the display image 900, an entire building which does not overlap the focal point detection frame group or a portion thereof may be displayed in an emphasized manner by being surrounded by a boundary line.

Moreover, in a modification, the display image may be generated by the display image generation unit 304 without requiring a triggering operation such as a half-press on a shutter, and the CPU 107 may display the display image on the display unit 113 such as a finder. With this configuration, when a user wants to capture an image by focusing on a person, for example, the user can immediately check that the subject being in the focusing state is not a person but a building by viewing the display image 900 (FIG. 13). Thus, the user can quickly input an instruction necessary for capturing an image by focusing on the person to the image capturing apparatus 1.

Figure 14:
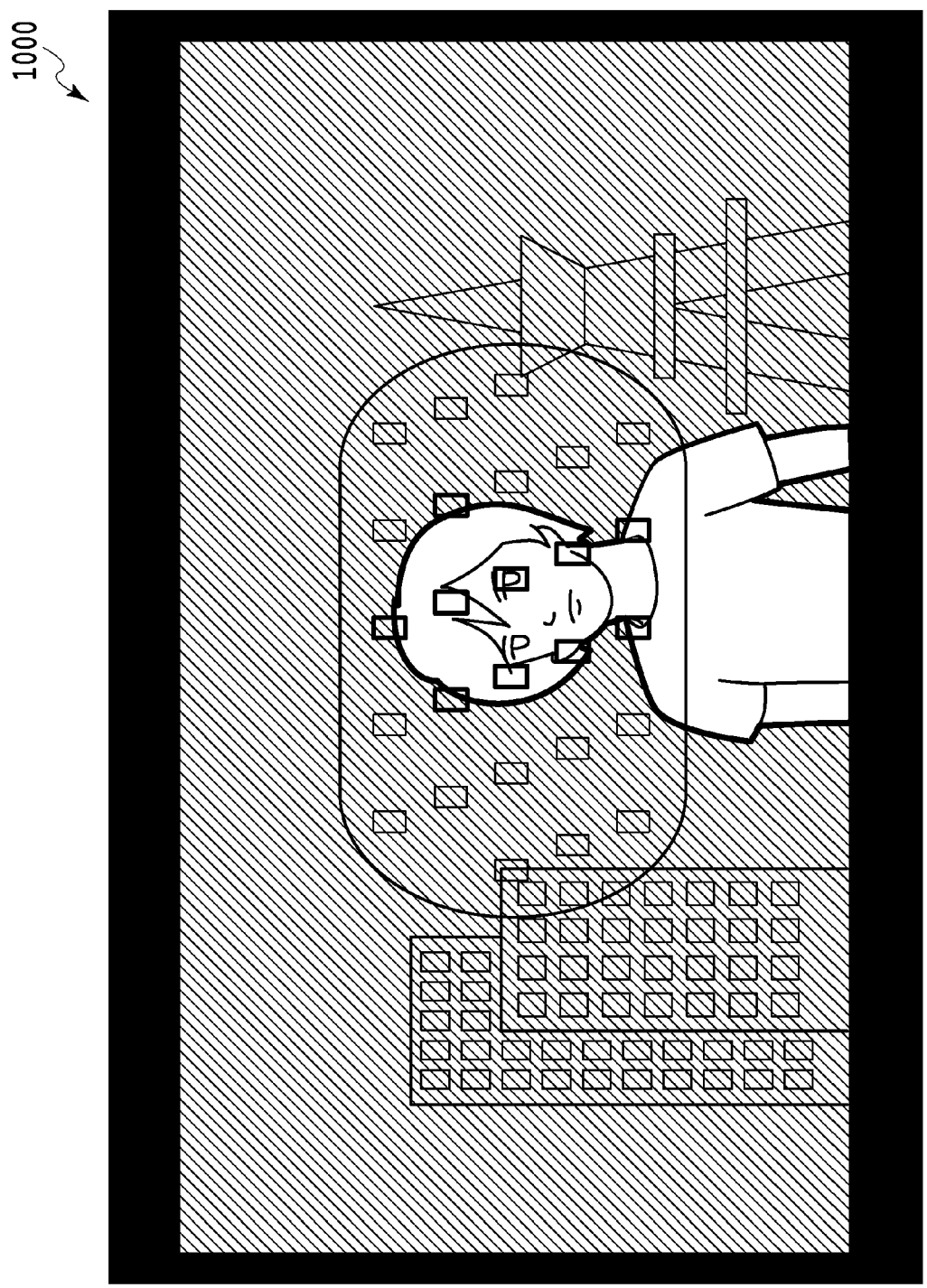
FIG. 14 is a diagram illustrating an example of a display image according to another embodiment.

Further, in another embodiment, the CPU 107 may display a display image on the display unit 113 based on the focus area data generated in S403 so that the brightness in the focus area is different from that of an area other than the focus area (FIG. 14). For example, the display image generation unit 304 can generate a display image in which a subject in the focusing state is displayed bright by averaging the pixel values at the corresponding pixel positions of the input image obtained from the image capturing unit 101 and the area image 600.

In this case, the input image obtained from the image capturing unit 101 may be an image of an arbitrary viewpoint among the multi-viewpoint images (FIG. 7) acquired in S401. Alternatively, the input image may be a synthesized image obtained by combining multi-viewpoint images, acquired by averaging the pixel values from the multi-viewpoint images acquired in S401.

Further, the display image displayed on the display unit 113 and various items of data (multi-viewpoint image data, disparity map image data, area image data, boundary image data, and the like) used for generating the image can be recorded on a recording medium. With this configuration, the disparity map image data, the area image data, and the like can be easily used for editing images after image capturing.

As described above, the plenoptic image capturing apparatus 1 of the present embodiment can display the focus area of a subject on the display unit 113 in a manner different from that of an area other than the focus area. The user can immediately check the focus area of the subject captured by the image capturing apparatus 1 from the display image displayed on the display unit 113 or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image capturing apparatus of the invention, it is possible to immediately check the focus area of a subject in a plenoptic image capturing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-183365, filed Sep. 16, 2015, which is hereby incorporated by reference wherein in its entirety.

What is claimed is:

1. An image capturing apparatus comprising:
   a display unit configured to display an image obtained from an image capturing unit, wherein the image capturing unit is capable of acquiring multi-viewpoint images which are a plurality of two-dimensional images with different viewpoints;
   at least one processor; and
   one or more memories storing instructions that, when executed by the at least one processor, cause the image capturing apparatus to:
      derive a disparity amount of the multi-viewpoint images in relation to a subject;
      specify, as a focus area, a partial subject area focused in an input two-dimensional image related to the multi-viewpoint images based on the derived disparity amount to generate focus area data that represent whether or not each pixel is included in the focus area;
      apply an edge detection filter to the focus area data so as to generate a boundary image indicating a boundary between the focus area and an area other than the focus area in the input image; and
      generate a display image that represents the specified focus area in a manner different from an area other than the focus area by using the input image and the boundary image.

2. The image capturing apparatus according to claim 1, wherein
   the input image is an image of an arbitrary viewpoint among the multi-viewpoint images.

3. The image capturing apparatus according to claim 1, wherein
   the input image is a synthesized image obtained by combining the multi-viewpoint images.

4. The image capturing apparatus according to claim 1, further comprising instructions that, when executed by the at least one processor, cause the image capturing apparatus to:

derive the disparity amount by calculating a standard deviation of each pixel of the multi-viewpoint images.

5. The image capturing apparatus according to claim 1, further comprising instructions that, when executed by the at least one processor, cause the image capturing apparatus to:
select a combination of two or more different images among the multi-viewpoint images and derive the disparity amount of the selected two or more images in relation to the subject.

6. The image capturing apparatus according to claim 5, wherein
the combination of two or more images is selected according to image capturing characteristics in each divided area of the multi-viewpoint images.

7. The image capturing apparatus according to claim 1, further comprising instructions that, when executed by the at least one processor, cause the image capturing apparatus to:
specify a subject area in which the disparity amount is equal to or smaller than a predetermined threshold as the focus area,
wherein the predetermined threshold is set based on an amount of noise that is expected to be included when the multi-viewpoint images are imaged by the image capturing unit.

8. The image capturing apparatus according to claim 1, further comprising instructions that, when executed by the at least one processor, cause the image capturing apparatus to:
generate the display image by overlaying, on the input image, a boundary image indicating a boundary between the specified focus area and an area other than the focus area in the input image.

9. The image capturing apparatus according to claim 1, further comprising instructions that, when executed by the at least one processor, cause the image capturing apparatus to:
generate the display image by making brightness in the specified focus area in the input image different from that in an area other than the focus area in the input image.

10. The image capturing apparatus according to claim 1, further comprising instructions that, when executed by the at least one processor, cause the image capturing apparatus to:
record, in a recording medium, the generated display image and data used for generating the image.

11. The image capturing apparatus according to claim 1, further comprising instructions that, when executed by the at least one processor, cause the image capturing apparatus to:
derive the disparity amount of each pixel in the input image so as to generate a disparity amount map; and
set the dispersion of a noise in the input image as a predetermined threshold, and compare the disparity amount of each pixel in the disparity amount map with the predetermined threshold so as to specify the focus area.

12. The image capturing apparatus according to claim 1, wherein the disparity amount of each pixel in the input image depends upon a subject.

13. The image capturing apparatus according to claim 1, further comprising instructions that, when executed by the at least one processor, cause the image capturing apparatus to:
specify, as the focus area, a subject area whose disparity amount is equal to or smaller than a predetermined threshold.

14. The image capturing apparatus according to claim 13, further comprising instructions that, when executed by the at least one processor, cause the image capturing apparatus to:
set a greater value as the predetermined threshold in an area in which a pixel value in the multi-viewpoint image is greater, and set a smaller value as the predetermined threshold in an area in which a pixel value in the multi-viewpoint image is smaller.

15. The image capturing apparatus according to claim 1, wherein the image capturing unit is a plenoptic image capturing unit.

16. A method for controlling an image capturing apparatus including a display unit configured to display an image obtained from an image capturing unit, wherein the image capturing unit is capable of acquiring multi-viewpoint images which are a plurality of two-dimensional images with different viewpoints, the method comprising:
deriving a disparity amount of the multi-viewpoint images in relation to a subject;
specifying, as a focus area, a partial subject area focused in an input two-dimensional image related to the multi-viewpoint images based on the derived disparity amount to generate focus area data that represents whether or not each pixel is included in the focus area;
applying an edge detection filter to the focus area data so as to generate a boundary image indicating a boundary between the focus area and an area other than the focus area in the input image; and
generating a display image that represents the specified focus area in a manner different from an area other than the focus area by using the input image and the boundary image.

17. The method for controlling an image capturing apparatus according to claim 16, wherein the image capturing unit is a plenoptic image capturing unit.

18. A non-transitory computer readable storage medium storing a program that, when executed by a computer, causes the computer to implement a method for controlling an image capturing apparatus including a display unit configured to display an image obtained from an image capturing unit, wherein the image capturing unit is capable of acquiring multi-viewpoint images which are a plurality of two-dimensional images with different viewpoints, the method comprising:
deriving a disparity amount of the multi-viewpoint images in relation to a subject;
specifying, as a focus area, a partial subject area focused in an input two-dimensional image related to the multi-viewpoint images based on the derived disparity amount to generate focus area data that represent whether or not each pixel is included in the focus area
applying an edge detection filter to the focus area data so as to generate a boundary image indicating a boundary between the focus area and an area other than the focus area in the input image; and
generating a display image that represents the specified focus area in a manner different from an area other than the focus area by using the input image.

19. The non-transitory computer readable storage medium according to claim 18, wherein the image capturing unit is a plenoptic image capturing unit.

* * * * *